United States Patent
Takakura et al.

(10) Patent No.: US 10,339,661 B2
(45) Date of Patent: Jul. 2, 2019

(54) MOVEMENT DIRECTION DETERMINATION METHOD AND MOVEMENT DIRECTION DETERMINATION DEVICE

(71) Applicant: PANASONIC INTELLECTUAL PROPERTY MANAGEMENT CO., LTD., Osaka (JP)

(72) Inventors: Saki Takakura, Osaka (JP); Mariko Takenouchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 15/526,563

(22) PCT Filed: Jun. 30, 2016

(86) PCT No.: PCT/JP2016/003138
§ 371 (c)(1),
(2) Date: May 12, 2017

(87) PCT Pub. No.: WO2017/017898
PCT Pub. Date: Feb. 2, 2017

(65) Prior Publication Data
US 2017/0330334 A1 Nov. 16, 2017

(30) Foreign Application Priority Data
Jul. 28, 2015 (JP) .................. 2015-148182

(51) Int. Cl.
*G03B 5/00* (2006.01)
*G06T 7/246* (2017.01)
*G06K 7/015* (2006.01)
*G06K 7/10* (2006.01)
(Continued)

(52) U.S. Cl.
CPC .............. *G06T 7/246* (2017.01); *G03B 5/00* (2013.01); *G06K 7/015* (2013.01); *G06K 7/10* (2013.01);
(Continued)

(58) Field of Classification Search
CPC .............. G06T 7/246; G06T 7/73; G03B 5/00
(Continued)

(56) References Cited

U.S. PATENT DOCUMENTS 8,596,541 B2 * 12/2013 Chiu ................... G06K 7/14
235/462.06
9,189,670 B2 * 11/2015 Moed .................. G06K 7/14
(Continued)

FOREIGN PATENT DOCUMENTS

JP 2005-182117 7/2005

OTHER PUBLICATIONS machine translation: JP 2007-202085 A, Ishibashi, Toshiji, Optical Information Reader.*
(Continued)

*Primary Examiner* — Clayton E. LaBalle
*Assistant Examiner* — Linda B Smith
(74) *Attorney, Agent, or Firm* — Greenblum & Bernstein, P.L.C.

(57) ABSTRACT

In order to provide movement-direction determination method and apparatus for appropriately informing a holder of a camera of a movement direction of the camera, a processor determines the movement direction of the camera that captures a polygonal recognition target in the movement-direction determination method and the movement-direction determination apparatus of the present disclosure. The processor acquires an orientation of the camera acquired by a sensor included in the camera, acquires an image of the recognition target captured by the camera, determines the
(Continued)

number of corners of the recognition target included in the image, and determines the movement direction of the camera based on the orientation of the camera and the number of corners.

10 Claims, 13 Drawing Sheets

(51) Int. Cl.
    *G06K 7/14*     (2006.01)
    *G06T 7/73*     (2017.01)
    *H04N 5/232*     (2006.01)

(52) U.S. Cl.
    CPC .................. *G06K 7/14* (2013.01); *G06T 7/73* (2017.01); *H04N 5/2328* (2013.01); *H04N 5/23222* (2013.01); *H04N 5/23254* (2013.01); *H04N 5/23264* (2013.01); *H04N 5/23293* (2013.01); *G06T 2207/30244* (2013.01)

(58) Field of Classification Search
    USPC ........................................................ 396/153
    See application file for complete search history.

(56) References Cited

U.S. PATENT DOCUMENTS

| | | | | |
|---|---|---|---|---|
| 9,609,217 | B2* | 3/2017 | Ju | H04N 5/23248 |
| 9,652,861 | B2* | 5/2017 | Yamaguchi | G06T 7/248 |
| 2004/0020989 | A1* | 2/2004 | Muramatsu | G06K 19/06037 |
| | | | | 235/462.1 |
| 2009/0009825 | A1* | 1/2009 | Honda | H04N 1/3878 |
| | | | | 358/488 |
| 2009/0110241 | A1* | 4/2009 | Takemoto | G06K 9/32 |
| | | | | 382/103 |
| 2009/0262206 | A1* | 10/2009 | Park | G08B 13/19641 |
| | | | | 348/218.1 |

OTHER PUBLICATIONS

Machine translation: JP 2007-207085, Ishibashi, Toshiji (Year: 2007).*
Search Report and Written Opinion in International WIPO Patent Application No. PCT/JP2016/003138, dated Sep. 13, 2016.

* cited by examiner

| ORIENTATION OF CAMERA (UPWARD DIRECTION) | REGION a | REGION b | REGION c | REGION d |
|---|---|---|---|---|
| REGION a | UP | RIGHT | DOWN | LEFT |
| REGION b | LEFT | UP | RIGHT | DOWN |
| REGION c | DOWN | LEFT | UP | RIGHT |
| REGION d | RIGHT | DOWN | LEFT | UP |

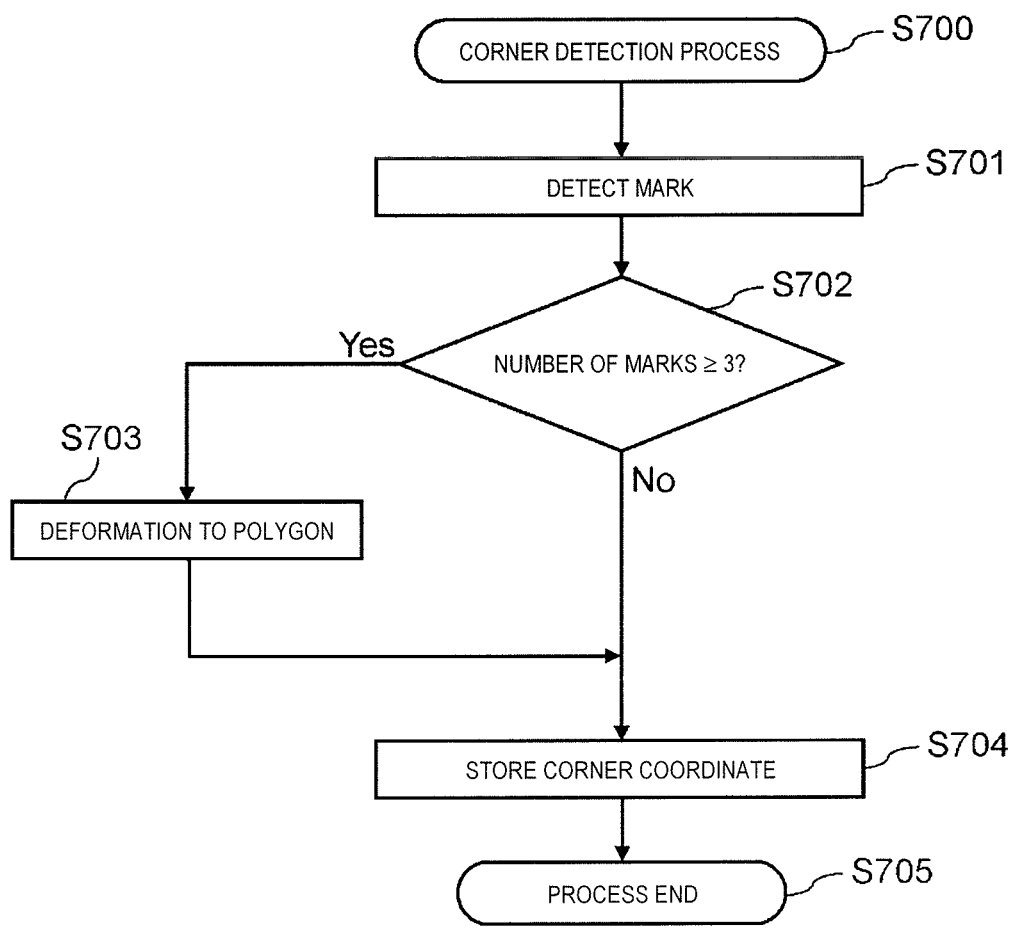

DETECTION MARK :

DETECTION MARK :

MOVEMENT DIRECTION DETERMINATION METHOD AND MOVEMENT DIRECTION DETERMINATION DEVICE

TECHNICAL FIELD

The present disclosure relates to a movement-direction determination method and a movement-direction determination apparatus.

BACKGROUND ART

PTL 1 includes code information deciphering means for deciphering code information from an imaged code image, lens movement means for moving a lens to gradually predetermined locations depending on focal depths at the respective imaging distances, and error notification means for notifying of a read error. In a case where codes are not deciphered by the code information deciphering means, control means for repeating an operation of moving the lens to the next stage, imaging the code again, and deciphering the code information and controlling the error notification means to notify of the error when the number of times the repetition is performed reaches the number of stages of the movement locations of the lens is further provided. Accordingly, a code reading device capable of reading a certain code at an arbitrary distance is provided without using a special auto-focusing device.

CITATION LIST

Patent Literature

PTL 1: Japanese Patent Unexamined Publication No. 2005-182117

SUMMARY OF THE INVENTION

The present disclosure is to provide movement-direction determination method and apparatus for appropriately informing a holder of the camera of a movement direction of a camera.

In movement-direction determination method and apparatus of the present disclosure, a processor determines a movement direction of a camera that images a polygonal recognition target. The processor acquires an orientation of the camera acquired by a sensor included in the camera, acquires an image of the recognition target imaged by the camera, determines the number of corners of the recognition target included in the image, and determines the movement direction of the camera based on the orientation of the camera and the number of corners.

The movement-direction determination method and apparatus of the present disclosure are useful in appropriately informing a holder of the camera of the movement direction of the camera.

BRIEF DESCRIPTION OF DRAWINGS

FIG. 7 is a flowchart showing a second example of corner detection process according to Exemplary Embodiment 1.

DESCRIPTION OF EMBODIMENTS

Figure 1:
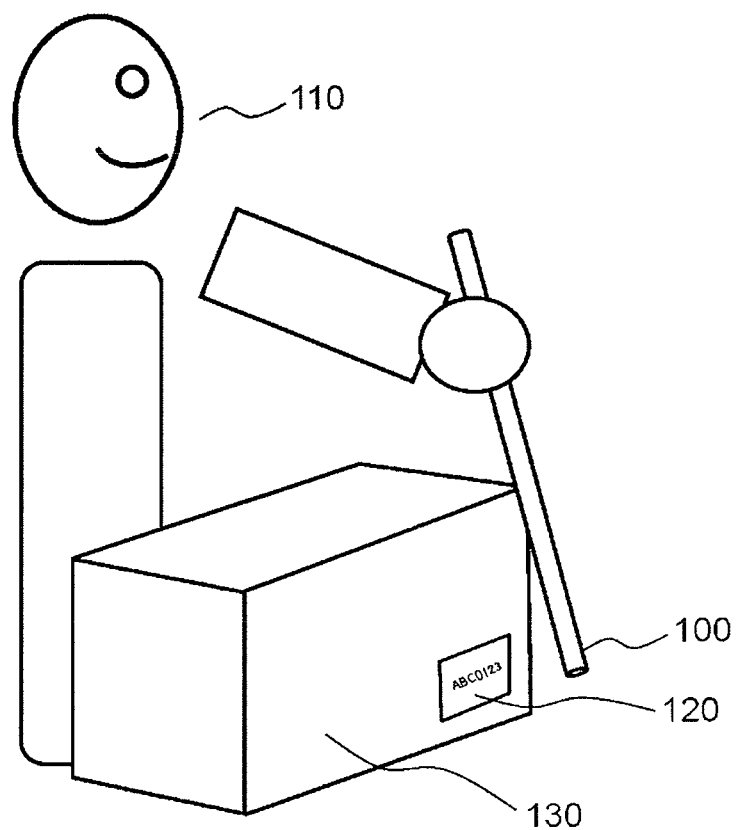
FIG. 1 is a diagram for describing a movement-direction determination apparatus according to Exemplary Embodiment 1 and a utilization example thereof.

Hereinafter, exemplary embodiments will be described in detail by appropriately referring to the drawings. Here, unnecessarily detailed description may be omitted. For example, the detailed description of the already well-known matters or the redundant description of the substantially same configurations may be omitted. By doing this, the following description is prevented from being unnecessarily redundant, and thus, those skilled in the art can easily understood the present disclosure.

The accompanying drawings and the following description are provided to allow those skilled in the art to sufficiently the present disclosure, and are not intended to limit the subject matters described in claims.

Exemplary Embodiment 1

Hereinafter, Exemplary Embodiment 1 will be described with reference to FIGS. 1 to 11.

[1-1. Configuration]

FIG. 1 is a diagram for describing a movement-direction determination apparatus according to Exemplary Embodiment 1 and a utilization example thereof.

Movement-direction determination apparatus 100 is a terminal including a camera therein. Movement-direction determination apparatus 100 is used by user 110. User 110 of the movement-direction determination apparatus uses movement-direction determination apparatus 100 in order to image a recognition target 120 by using the camera built in movement-direction determination apparatus 100.

Recognition target 120 is imaged by the camera, and thus, a processor built in movement-direction determination apparatus 100 may process image information of recognition target 120. The processor processes the image information of recognition target 120, and thus, the processor may record an attribute of freight 130 to which recognition target 120 is attached in a storage built in movement-direction determination apparatus 100, or may be notified to the user of movement-direction determination apparatus 100 through an output device.

Recognition target 120 has a polygonal planar shape. As a specific example, there are an image (barcode or two-dimensional code) defined based on a predetermined rule and a delivery list (business card or tag) on which specific character information is described. Although a rectangular recognition target will be described as an example in the present exemplary embodiment, the present disclosure may be applied to recognition targets having shapes other than the rectangle.

An example of a state in which movement-direction determination apparatus 100 is used will be described. It is assumed that it is difficult for user 110 to visually observe recognition target 120 in using movement-direction determination apparatus 100 as shown in FIG. 1. In such a case, it is difficult to appropriately image the recognition target by using (the camera built in) movement-direction determination apparatus 100 held by user 110. Thus, movement-direction determination apparatus 100 of the present disclosure informs user 110 of a desired movement direction of (the camera built in) movement-direction determination apparatus 100 by using a movement instruction.

The example shown in FIG. 1 is an example for easily describing a utilization example of the movement-direction determination apparatus. Movement-direction determination apparatus 100 does not need to have a rod shape shown in FIG. 1. Movement-direction determination apparatus 100 may be a separate member from the camera held by user 110. That is, a camera that acquires an image may be held by user 110, and movement-direction determination apparatus 100 that determines the movement direction based on the image imaged by the camera may be provided in an outside place via a communication network. In such a case, the movement instruction of movement-direction determination apparatus 100 is informed to user 110 who holds the camera.

Figure 2:
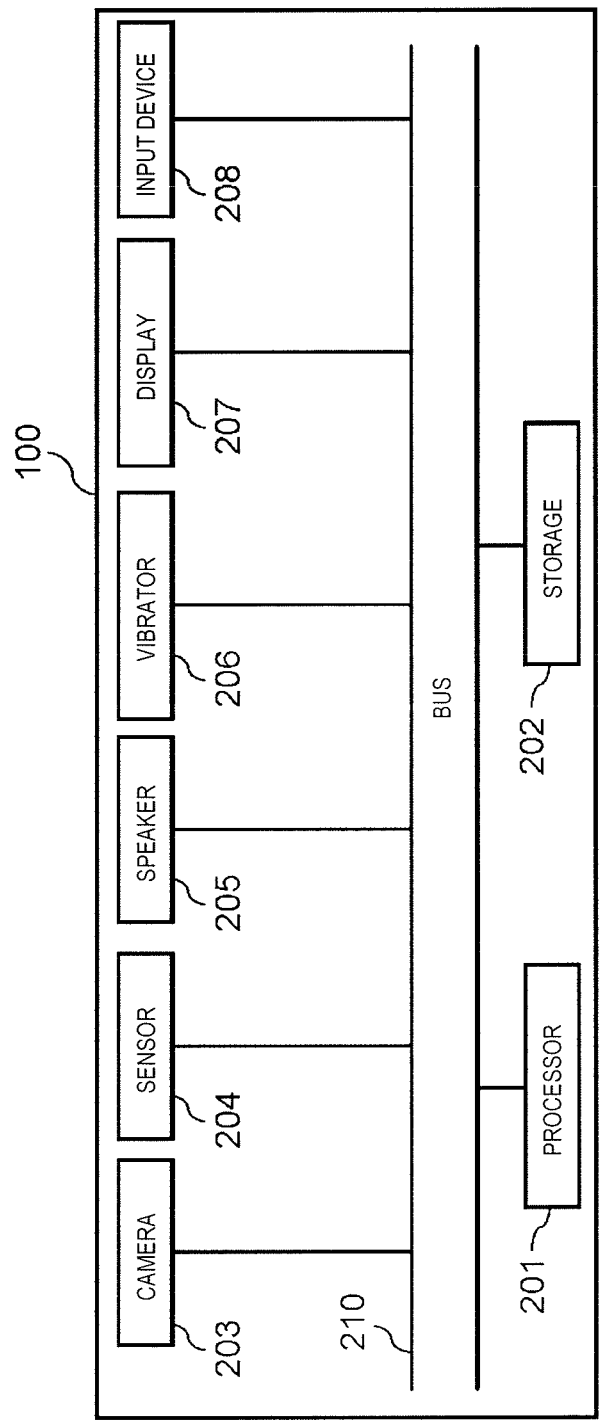
FIG. 2 is a block diagram of the movement-direction determination apparatus according to Exemplary Embodiment 1.

FIG. 2 is a block diagram of the movement-direction determination apparatus according to Exemplary Embodiment 1.

Processor 201 controls other elements of movement-direction determination apparatus 100 through bus 210. As an example, processor 201 may be a general-purpose central processing unit (CPU). Processor 201 may execute a predetermined program. Processor 201 executes the predetermined program, and thus, movement-direction determination apparatus 100 is operated.

Storage 202 acquires various information items from other elements, and retains these information items temporarily or permanently. Storage 202 is a generic term of a so-called primary storage device and a so-called secondary device, and a plurality of storages 202 may be physically provided. For example, a dynamic random access memory (DRAM), a hard disk drive (HDD), or a solid state drive (SSD) is used as storage 202.

Camera 203 includes an imaging device and a lens therein.

Sensor 204 is a generic term of a tilt sensor and a distance measurement sensor.

Speaker 205, vibrator 206, and display 207 present information capable of being perceived by user 110 to the outside. Information presented by speaker 205, vibrator 206, and display 207 is included in information regarding the movement direction. The information regarding the movement direction includes information indicating a displacement within a space coordinate such as upward, downward, leftward, rightward, frontward, or rearward, and information indicating that a current location of the camera is correct or incorrect. Speaker 205 may present the information regarding the movement direction by using sound. Vibrator 206 may present the information regarding the movement direction by using a vibration location or a vibration pattern. Display 207 may present the information regarding the movement direction by using visual information.

Input device 208 receives information from the outside. The information received by input device 208 from the outside includes information regarding an input from the user of movement-direction determination apparatus 100. As an example, input device 208 may be an input interface such as a keyboard.

The configuration of movement-direction determination apparatus 100 described above is an example. Some of the respective constituent elements of movement-direction determination apparatus 100 may be integrated with other elements. Some of the respective constituent elements of movement-direction determination apparatus 100 may be divided into a plurality of elements. Some of the respective constituent elements of movement-direction determination apparatus 100 may be omitted. Movement-direction determination apparatus 100 may be constituted by adding other elements with the movement-direction determination apparatus.

[1-2. Operation]

A movement-direction instruction process performed by the terminal having the above-described configuration will be described.

Figure 3:
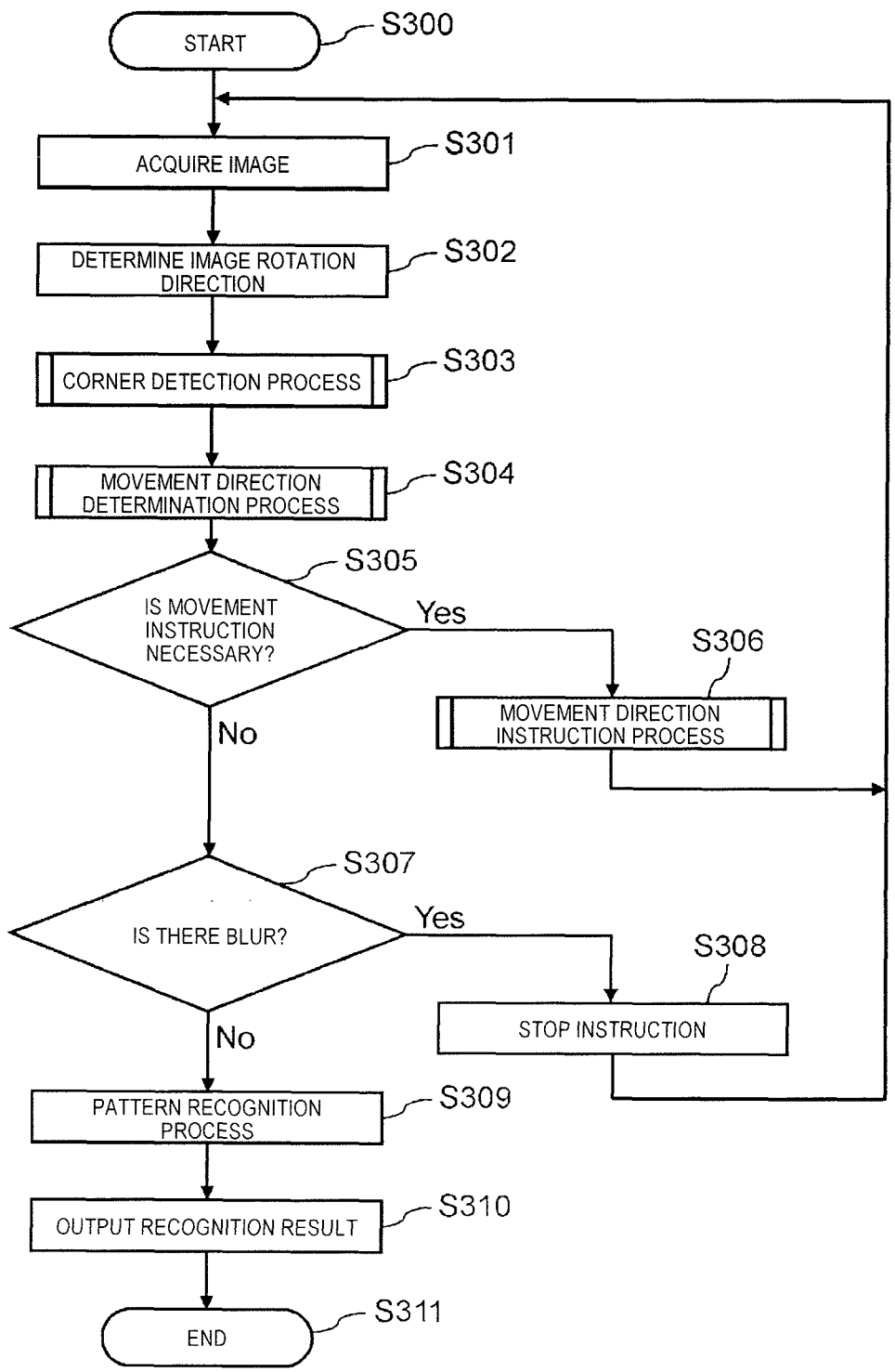
FIG. 3 is a flowchart showing a measurement process according to Exemplary Embodiment 1.

FIG. 3 is a flowchart showing a process performed by the movement-direction determination apparatus according to Exemplary Embodiment 1.

The process disclosed in FIG. 3 may be a process including the movement-direction instruction process, and may be a process including a pattern recognition process performed after the camera is moved to a correct location in addition to the movement-direction instruction process.

The process disclosed in FIG. 3 is realized through the cooperation of processor 201 with other constituent elements. Specifically, processor 201 performs a calculation process based on the program recorded in storage 202, sends a command to other elements during the calculation process, and acquires information. Thus, the process disclosed in FIG. 3 is performed.

In step S300, processor 201 starts the process. As an example of a timing when processor 201 starts the process, there is a timing when a power supply of movement-direction determination apparatus 100 is turned ON or a timing when an application recorded in storage 202 of movement-direction determination apparatus 100 is performed by processor 201. In the present exemplary embodiment, it is assumed that processor 201 starts the process in a state shown in FIG. 1.

In step S301, processor 201 acquires an image. Processor 201 reads the image imaged by the imaging device of camera 203, and thus, processor 201 acquires the image.

In step S302, processor 201 determines a rotation direction of the image acquired in step S301. The rotation direction means upward, downward, leftward, or rightward direction as a criterion when the image is processed. The rotation direction is determined based on an orientation of camera 203. In step S302, processor 201 acquires an upward direction (a direction in which a gravitational acceleration is −1 G; hereinafter, simply referred to as an upward direction of camera 203) viewed from camera 203, as the orientation of camera 203, from an output of sensor 204. Processor 201 determines the upward direction of camera 203 on image 400 based on the acquired upward direction of camera 203, and determines the rotation direction with the upward direction of camera 203 on image 400 as the criterion. Although it has been described in the present exemplary embodiment that the upward direction of camera 203 is used as an example of the orientation of camera 203, the rotation direction may be determined with a horizontal direction or a downward direction of camera 203 as the orientation of camera 203 as the criterion.

Figures 4A, 4B:
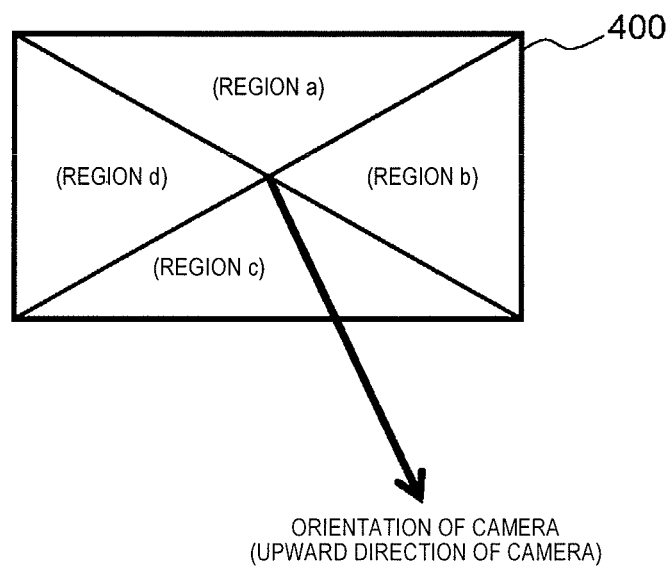
FIG. 4A is a diagram for describing a rotation direction of an image according to Exemplary Embodiment 1.
FIG. 4B is a diagram for describing the rotation direction of the image according to Exemplary Embodiment 1.

FIGS. 4A and 4B are diagrams for describing the rotation direction of the image according to Exemplary Embodiment 1. As shown in FIG. 4A, processor 201 determines a region in which the upward direction (direction in which the gravitational acceleration is −1 G) of camera 203 on image 400 is present from the output of sensor 204. The direction in which the gravitational acceleration is −1 G may be determined by referring to the output of an acceleration sensor serving as sensor 204. The upward direction of camera 203 on image 400 is determined by superimposing the direction in which the gravitational acceleration is −1 G on image 400 and determining a region for which this direction heads from a center of image 400. Here, it is assumed that the acceleration sensor together with the imaging device is provided within camera 203 and a relative disposition relationship between an orientation (initial disposition of the image read in step S301) which the imaging device faces and an orientation in which the acceleration sensor detects acceleration is known to processor 201.

The rotation direction of the image is determined as represented in FIG. 4B depending on the upward direction of camera 203 on image 400 determined as stated above. For example, in a case where camera 203 is imaged upside down, the upward direction of camera 203 on the image is region c. By doing this, the rotation direction is determined such that region a is the downward direction, region b is the rightward direction, region c is the upward direction, and region d is the leftward direction, as represented in the table. If a predetermined region of the image is assumed as the upward direction of camera 203 and a process of converting the assumed direction into another direction based on the rotation direction is completed until the movement direction is ultimately determined at the latest when necessary, the same advantages as those in step S302 are acquired. However, for the sake of simplicity in description, it is assumed in the present exemplary embodiment that the orientation of the image processed by processor 201 is logically defined as the orientation determined by the rotation direction in step S302.

In step S303, processor 201 performs a corner detection process. The corner detection process is a process of determining coordinates of corners of recognition target 120 included in the image within the image. The image refers to an image which is acquired in step S301 and is rotated in step S302.

The corner detection process will be described by using two processes. In the following two processes, any one thereof may be selected by processor 201 depending on the kind of recognition target 120, or two processes may be performed in parallel or in sequence.

Figure 5:
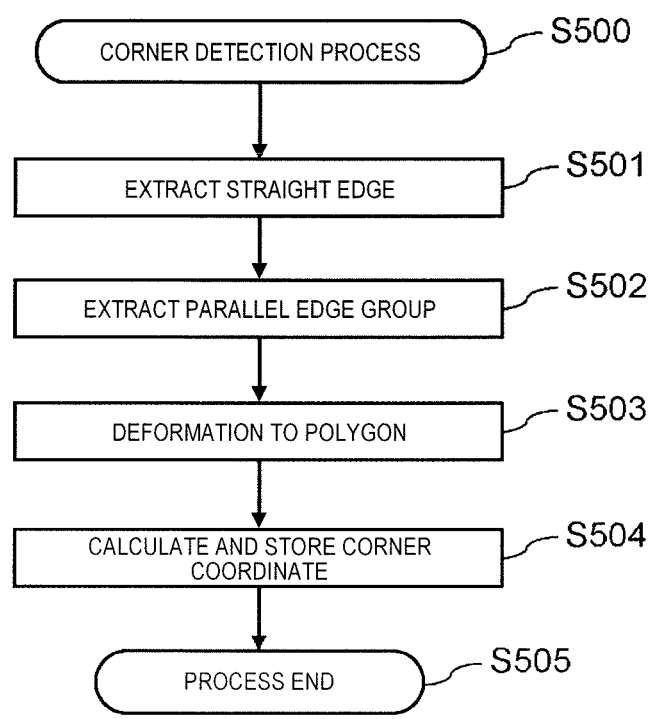
FIG. 5 is a flowchart showing a first example of a corner detection process according to Exemplary Embodiment 1.

FIG. 5 is a flowchart showing a first example of the corner detection process according to Exemplary Embodiment 1.

FIGS. 6A to 6F 6E are diagrams showing the first example of the corner detection process according to Exemplary Embodiment 1.

Figure 6A:
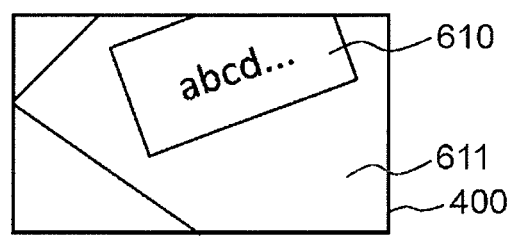
FIG. 6A is a diagram showing the first example of the corner detection process according to Exemplary Embodiment 1.
Figure 6B:
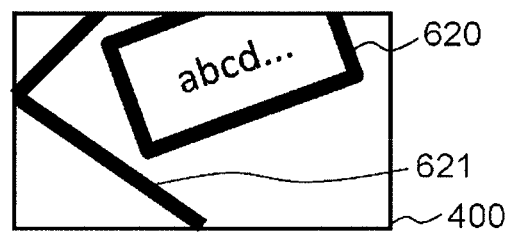
FIG. 6B is a diagram showing the first example of the corner detection process according to Exemplary Embodiment 1.

In step S500, processor 201 starts the corner detection process. In the present exemplary embodiment, a corner detection process performed on an image acquired by imaging business card 610 adhering onto corrugated board 611 will be described as an example, as shown in FIG. 6A.

In step S501, processor 201 extracts straight edges of image 400. As the method of extracting the edges from image 400, a method of extracting portions in which luminance values of pixels of image 400 are remarkably further changed than those of surrounding pixels or various known edge detection algorithms may be applied. Processor 201 selects the straight edges from the acquired edges. The straight edges are edges each having a predetermined line-segment length or more among the acquired edges. Processor 201 extracts the straight edges by performing matching of a set of acquired edges with a line-segment shape and extracting the edges having a predetermined length or more. Edge 620 (characters within the business card are extracted as the edges but are not extracted as the straight edges) of the business card shown in FIG. 6B and corrugated board edge 621 are acquired by extracting the straight edges from the image shown in FIG. 6A.

Figure 6C:
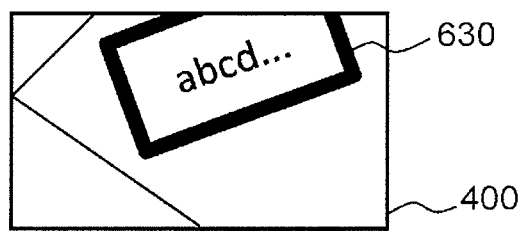
FIG. 6C is a diagram showing the first example of the corner detection process according to Exemplary Embodiment 1.

In step S502, processor 201 extracts a group of parallel edges. The group of parallel edges refers to a group of edges which are nearly parallel among the straight edges acquired in step S501. Processor 201 determines whether or not the group of straight edges is parallel by calculating an inner product of a vector component of the straight edge and a vector component of another straight edge. If the group of parallel edges is extracted from the straight edges shown in FIG. 6B, parallel edge 630 with a group of edges of short sides and a group of edges of long sides of the business card as elements is extracted, as shown in FIG. 6C.

Figure 6D:
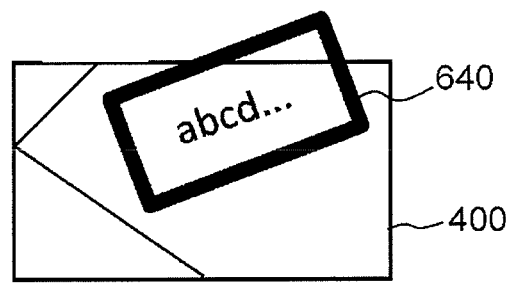
FIG. 6D is a diagram showing the first example of the corner detection process according to Exemplary Embodiment 1.

In step S503, processor 201 deforms the group of parallel edges extracted in step S502 to a polygon. The polygon refers to a polygon predetermined as an appropriately outer shape of recognition target 120 in advance. In the present exemplary embodiment, an example in which a rectangle is used as an example of the polygon will be described. Processor 201 generates the polygon by selecting two groups of pairs of parallel edges extracted in step S502 and extending the parallel edges. As the shape of the polygon generated by extending the parallel edges, a plurality of shapes may be acquired. In such a case, the number of recognition targets included in image 400 may be regarded as one, and one polygon may be selected depending on a next priority. As an example of the priority, there are (1) a priority in a case where a center of gravity of the polygon is closest to a center of image 400, (2) a priority in a case where an area of the polygon is the largest, (3) a priority in a case where an average of differences between lengths of adjacent sides of sides constituting the polygon approximates 0, and (4) a priority in a case where a ratio of the sides of the polygon approximates a predetermined value (a criterion of a new priority may be determined by combining a plurality of priorities). Processor 201 deforms the group of parallel edges to the polygon, and thus, the edge is extended up to the outside of image 400 as shown in FIG. 6D. As a result, polygon 640 is acquired.

Figure 6E:
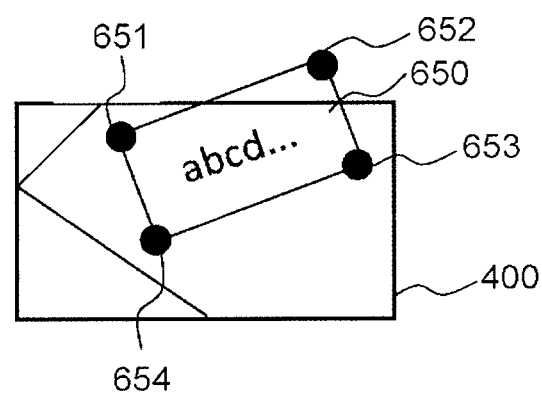
FIG. 6E is a diagram showing the first example of the corner detection process according to Exemplary Embodiment 1.

In step S504, processor 201 calculates corner coordinates of the polygon acquired in step S503, and stores the calculated coordinates in storage 202. As shown in FIG. 6E, corner 651, corner 652, corner 653, and corner 654 are acquired from polygon 650. Here, in a case where coordinates are located out of a range of image 400 like the coordinates of corner 652 of FIG. 6E, processor 201 stores a flag indicating that the corner coordinates are located out of the range of the image and all the corner coordinates including the coordinates in storage 202. The coordinates refer to a two-dimensional coordinate system that includes entire image 400, as a part thereof.

In step S505, processor 201 ends the corner detection process. Thereafter, the process proceeds to step S304.

FIG. 7 is a flowchart showing a second example of corner detection process according to Exemplary Embodiment 1.

In the second example, a process in a case where detection marks are previously attached to the corners of recognition target 120 is illustrated.

Figure 8A:
FIG. 8A is a diagram showing the second example of the corner detection process according to Exemplary Embodiment 1.
Figure 8B:
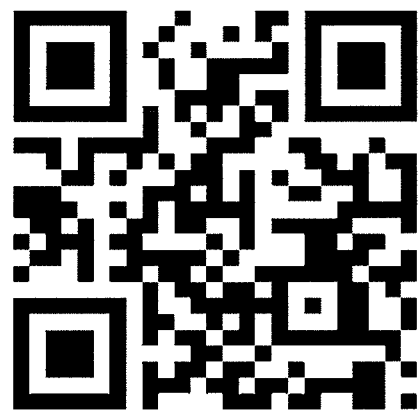
FIG. 8B is a diagram showing the second example of the corner detection process according to Exemplary Embodiment 1.
Figure 8C:
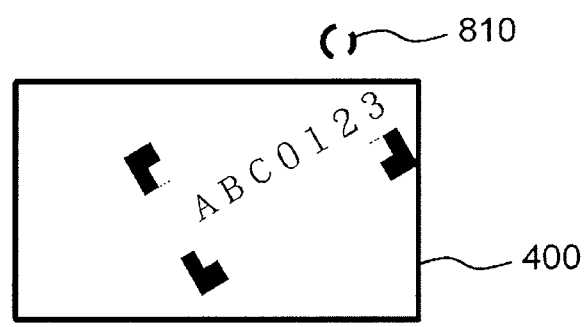
FIG. 8C is a diagram showing the second example of the corner detection process according to Exemplary Embodiment 1.

FIGS. 8A to 8C are diagrams showing the second example of the corner detection process according to Exemplary Embodiment 1. As an example of the case where the detection marks are previously attached to the corners of recognition target 120, there are a case where hook-shaped detection marks are attached to the corners as shown in FIG. 8A or a case where detection marks determined by a standard such as a two-dimensional barcode are attached as shown in FIG. 8B.

In step S700, processor 201 starts the corner detection process.

In step S701, processor 201 detects the detection marks from image 400. The method of detecting the detection marks from image 400 may be performed using a pattern matching algorithm.

In step S702, processor 201 determines whether or not the number of detection marks detected in step S701 is 3 or more.

In a case where the number of detection marks is 3 or more (Yes in step S702), processor 201 generates the polygon by connecting the detected marks with line segments (step S703). The polygon refers to a polygon predetermined as an appropriately outer shape of recognition target 120 in advance. In the present exemplary embodiment, an example in which a rectangle is used as an example of the polygon will be described. In a case where the rectangle is dealt as the polygon, in a case where only three (the number of corners of the polygon–1) detection marks are detected as shown in FIG. 8C, it is necessary to estimate the coordinates of one remaining corner in order to generate the rectangle by connecting the detection marks with the line segments.

Here, in a case where orientations (shapes) of the detection marks are different in locations of four corners like the detection marks shown in FIG. 8A, processor 201 may determine any one location of upper right, upper left, lower right, and lower left in which each detection mark is located based on the orientation (shape) of the detection mark.

Accordingly, in the state shown in FIG. 8C, processor 201 may determine that the detection marks located in the upper left, lower left, and lower right are detected. Therefore, the coordinates of corner 810 may be estimated by drawing a line segment in parallel with a line segment that connects the detection mark located in the lower left and the detection mark located in the upper left at a distance equal to the line segment by using the detection mark located in the lower right as an origin in a direction in which adjacent detection marks are not present. By doing this, even in a case where only three detection marks are detected, the coordinates of the remaining detection marks may be estimated.

Meanwhile, in a case where the orientations (shapes) of the detection marks are not able to be recognized in the locations of the corners like the detection marks shown in FIG. 8B, it is necessary to estimate the coordinates of the remaining corners by a method different from the case shown in FIG. 8A in order to generate the polygon. As an example, there is a method of acquiring the rectangle (quadrilateral) having the largest side of a triangle acquired by connecting three detected detection marks as a diagonal line and corners that do not form the triangle as vertices. The coordinate, which is located in the location farthest from the coordinates of the detection mark, among the corner coordinates of the rectangle acquired by the method, may be estimated as the coordinates of the remaining corner. Thus, it is assumed that the rectangle acquired as stated above is deformed to the polygon.

In step S704, processor 201 records the coordinates of the corners detected in step S701 or the coordinates of the corners of the polygon acquired in step S703 in storage 202. Similarly to step S504 described above, in a case where the coordinates of the corners are located out of the range of image 400, the processor stores the flag indicating that the coordinates are located out of the range of the image and all the corner coordinates including the corner coordinates located out of the range in storage 202. The coordinates refer to a two-dimensional coordinate system that includes entire image 400, as a part thereof.

In step S705, processor 201 ends the corner detection process. Thereafter, the process proceeds to step S304.

In step S304, processor 201 performs a movement-direction determination process. Hereinafter, the movement-direction determination process will be described with reference to FIG. 9.

Figure 9:
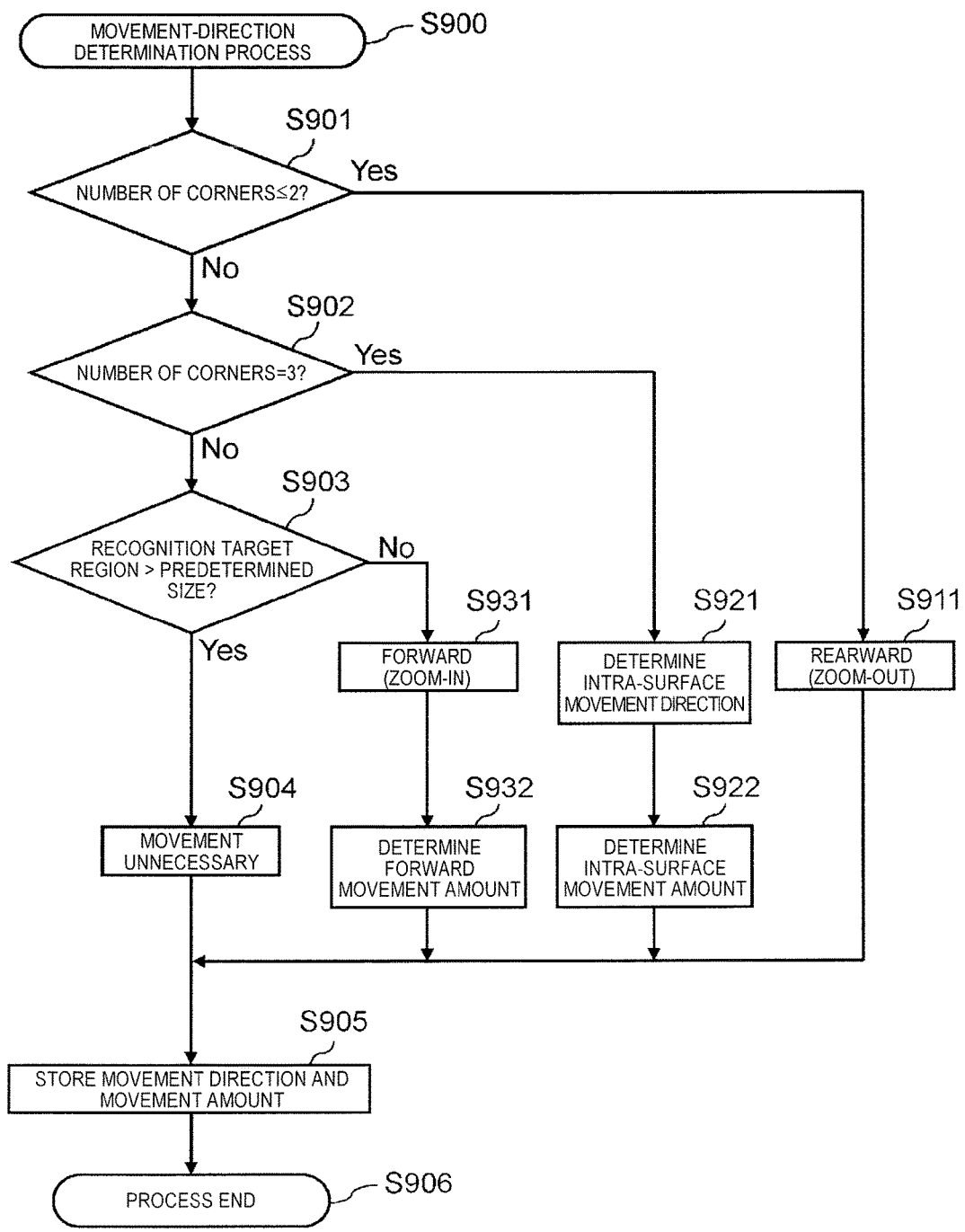
FIG. 9 is a flowchart for describing a movement-direction determination process according to Exemplary Embodiment 1.

FIG. 9 is a flowchart for describing the movement-direction determination process according to Exemplary Embodiment 1.

In step S900, processor 201 starts the movement-direction determination process.

In step S901, processor 201 determines whether or not the number of corner coordinates stored in step S704 is equal to or less than 2 (a first predetermined value (the number of corners of the recognition target–2)). The number of corner coordinates located out of the range of image 400 is not included in the number of corner coordinates stated herein. Processor 201 may determine whether or not the corner coordinates are located within image 400 or out of the image by investigating the flag indicating that the coordinates recorded in storage 202 are out of the range of the image. In a case where the number of corner coordinates is greater than 2 (No in step S901), the process proceeds to step S902.

In step S902, processor 201 determines whether or not the number of corner coordinates stored in step S704 is 3 (a second predetermined value (the number of corners of the recognition target–1)). In a case where the number of corner coordinates is not 3 (No in step S902), the process proceeds to step S903.

In step S903, processor 201 determines whether or not a recognition target region is larger than a predetermined size.

Here, the recognition target region is a region within the polygon formed by connecting the detected corner coordinates. In a case where the recognition target region is larger than the predetermined size (Yes in step S903), the process proceeds to step S904.

In step S904, processor 201 generates information indicating "no movement direction, movement amount 0", and records the generation of the information in storage 202 in step S905.

In a case where the number of corner coordinates is equal to or less than 2 (YES in step S901), the process proceeds to step S911.

In step S911, processor 201 calculates a movement amount to the forward direction. The reason why only two corner coordinates or less are detected is that it is assumed that a distance between camera 203 and recognition target 120 is extremely short.

In step S905 after step S911, processor 201 records the movement direction (rearward) and the movement amount in storage 202.

In a case where the number of corner coordinates is 3 (Yes in step S902), the process proceeds to step S921.

In step S921, processor 201 determines an intra-surface movement direction. A case where the number of corner coordinates is 3 means that the corner coordinates which are not included in image 400 is recorded in storage 202 in step S504 or step S704. Processor 201 determines the intra-surface movement direction as the movement direction of the camera according to the results of two processes of (1) a process of determining a direction in which the corner coordinates which are not included in image 400 are located according to the rotation direction of the image determined in step S302 and (2) a process of determining whether or not the camera direction is the same as a sightline direction.

Figure 10A:
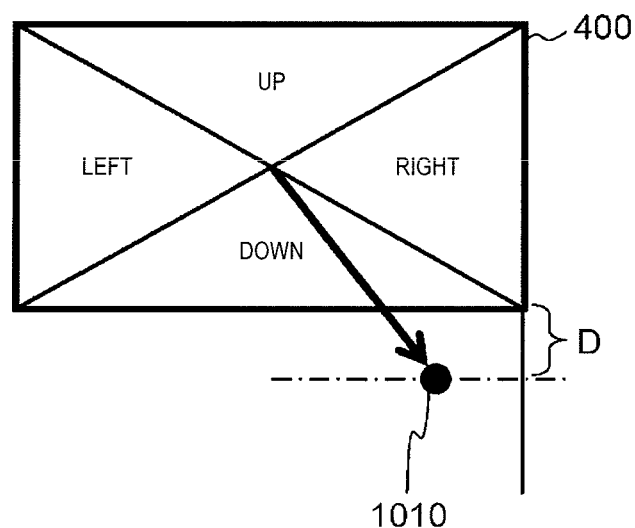
FIG. 10A is a diagram for describing a method of determining an intra-surface movement direction according to Exemplary Embodiment 1.
Figure 10B:
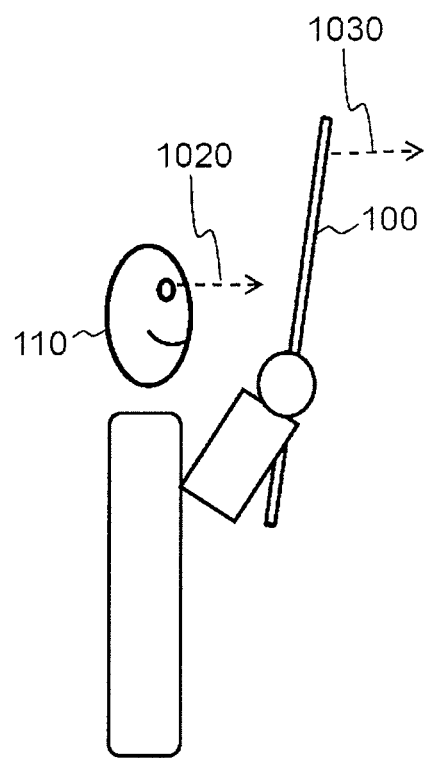
FIG. 10B is a diagram for describing the method of determining an intra-surface movement direction according to Exemplary Embodiment 1.
Figure 10C:
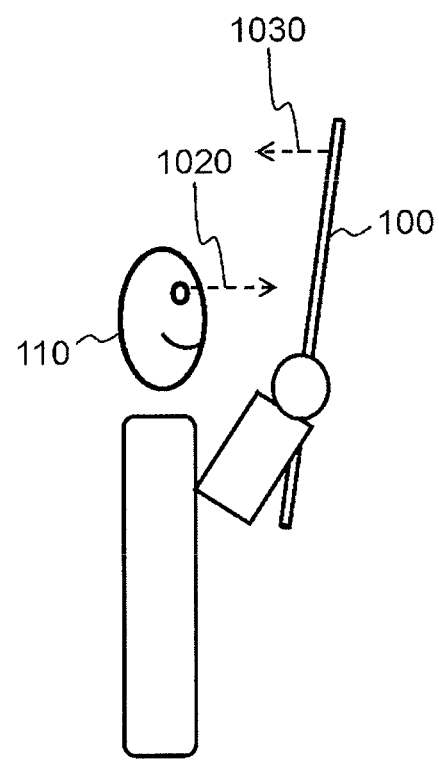
FIG. 10C is a diagram for describing the method of determining an intra-surface movement direction according to Exemplary Embodiment 1.

FIGS. 10A to 10C are diagrams for describing a method of determining the intra-surface movement direction according to Exemplary Embodiment 1.

In the process (1), processor 201 reads coordinates of corner coordinates 1010 (corner coordinates located out of image 400) from storage 202 as shown in FIG. 10A, and determines a region through which a line drawn to the coordinates from the center of image 400 passes in the rotation direction of the image determined in step S302. In FIG. 10A, a line drawn toward corner coordinates 1010 from the center of image 400 passes through a region indicating the down side in the rotation direction. Accordingly, processor 201 assumes the downward direction as the intra-surface movement direction in the process (1).

Subsequently, in the process (2), processor 201 determines whether or not sightline direction 1020 of user 110 matches the orientation of imaging direction 1030 of the camera of movement-direction determination apparatus 100. As one of the determination methods, there is a method of allowing the user to record information indicating whether or not sightline direction 1020 of user 110 matches the orientation of imaging direction 1030 of the camera of movement-direction determination apparatus 100 in storage 202 through input device 208. The determination result of whether or not the sightline direction matches the orientation of the imaging direction is called a matching determination result.

In a case where it is determined in the process (2) that sightline direction 1020 of user 110 and the orientation of imaging direction 1030 of the camera of movement-direction determination apparatus 100 match each other, processor 201 determines the direction acquired by the process (1) as the intra-surface movement direction. In a case where it is determined in the process (2) that sightline direction 1020 of user 110 and the orientation of imaging direction 1030 of the camera of movement-direction determination apparatus 100 do not match each other, processor 201 inverts the left and right sides of the direction acquired by the process (1). By doing this, sense of direction and a movement direction of user 110 can be matched.

In step S922, processor 201 may determine the intra-surface movement amount based on deviation amount D of corner coordinates 1010 from image 400, as shown in FIG. 10A. If D is the number of pixels in which corner coordinates 1010 are deviated from image 400 in the rotation direction, intra-surface movement amount ΔL is expressed by the following expression.

[Expression 1]

$$\Delta L = d \cdot D \quad (1)$$

d is an inverse number of a resolution (dpmm (dot/mm)) in Expression (1), and is expressed by the following expression.

[Expression 2]

$$d = K \cdot Z \quad (2)$$

K is a constant determined by the camera in Expression (2). In Expression (2), Z is a distance from camera 203 to recognition target 120. The distance from camera 203 to recognition target 120 is a distance acquired by disposing a distance measurement sensor serving as sensor 204 near camera 203 within camera 203. As an example of the distance measurement sensor, there is a sensor that measures a distance to recognition target 120 by emitting a radio wave having a predetermined wavelength to recognition target 120 and recognizing the radio wave rebounded from the recognition target. In a case where the distance measurement sensor is not used, a predetermined fixed value may be used as the movement amount. Even in a case where the distance measurement sensor is not used, a change in amount regarding D may be dealt as the movement amount in order to determine only an increase in movement amount, as in the determination of S1102 or S1103 to be described below.

If the process of step S921 or step S922 is ended, processor 201 records the movement direction and the movement amount in storage 202 in step S905.

In a case where the recognition target region is smaller than a predetermined size (No in step S903), the process proceeds to step S931.

In step S931, processor 201 sets the movement direction to be the forward direction (or "zoom-in"), that is, the sightline direction of the user. By doing this, it is possible to further increase the recognition target region of image 400.

In step S932, processor 201 determines a movement amount to the sightline direction of the user.

If the distance to recognition target 120 acquired by the distance measurement sensor is Z, movement amount ΔZ to the sightline direction is expressed by the following expression.

[Expression 3]

$$\Delta z = z(1 - l/R) \quad (3)$$

l is a length of the recognition target region in a vertical direction or a horizontal direction in Expression (3). R is a value acquired by dividing L by l. L is a length of image 400 in the vertical direction or the horizontal direction, and is a length of the direction corresponding to l. R means a magnification with which the recognition target region is to be magnified. In a case where the distance measurement sensor is not used, a predetermined fixed value may be used as the movement amount.

In step S905 after step S932, processor 201 records the movement direction (rearward) and the movement amount in storage 202.

In step S922 and step S932, processor 201 arbitrarily determines whether or not to calculate the movement amount. In a case where processor 201 does not calculate the movement amount, only the movement direction is recorded in storage 202 in step S905.

In step S906, processor 201 ends the movement-direction determination process. If step S906 is ended, since step S304 is ended, the process proceeds to step S305 as shown in FIG. 3.

In step S305, processor 201 determines whether or not the movement instruction is necessary for the user of movement-direction determination apparatus 100 by referring to storage 202. Processor 201 determines that the movement instruction is unnecessary in a case where "movement unnecessary" is recorded in storage 202. Processor 201 determines that the movement instruction is necessary in a case where "movement direction" is recorded in storage 202.

In a case where it is determined that the movement instruction is necessary in step S305 (Yes in step S305), processor 201 performs the movement-direction instruction process in step S306.

Figure 11:
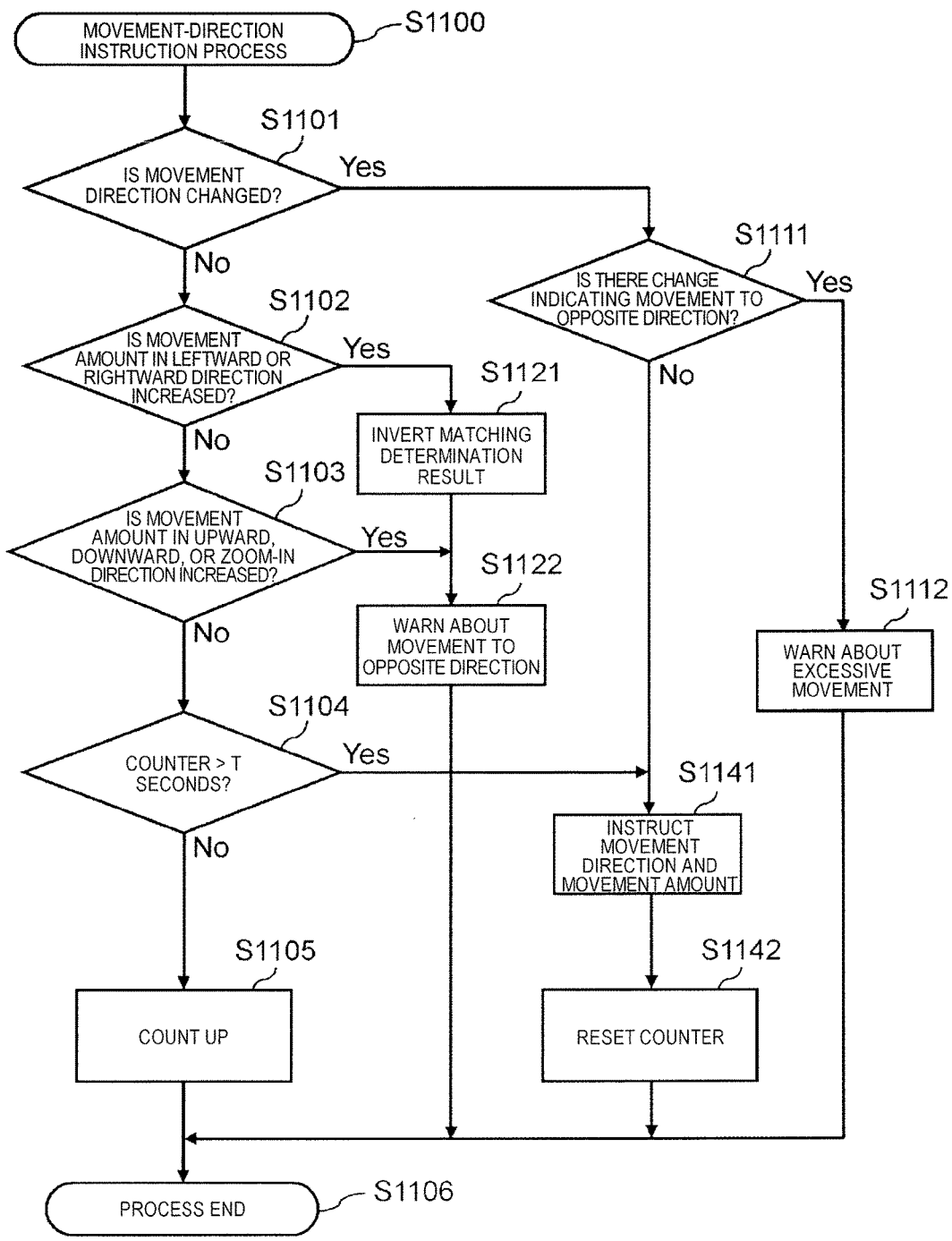
FIG. 11 is a flowchart for describing a movement-direction instruction process according to Exemplary Embodiment 1.

FIG. 11 is a flowchart for describing the movement-direction instruction process according to Exemplary Embodiment 1.

In step S1100, processor 201 starts the movement-direction instruction process.

In step S1101, processor 201 determines whether or not the movement direction recorded in storage 202 is changed. A case where the "the movement direction is changed" in step S1101 includes a case where a state in which the movement direction is not recorded in storage 202 is changed to a state in which the movement direction (which does not include the recording of "no" movement direction) is recorded.

In a case where the determination result of step S1101 is Yes, the process proceeds to step S1111. In step S1111, processor 201 determines whether or not the movement direction recorded in storage 202 is changed to an opposite direction. That is, processor 201 compares the previously determined movement direction with the currently determined movement direction. The movement direction in the present exemplary embodiment is six types of upward, downward, leftward, rightward, forward, and rearward, and the upward and downward directions are opposite to each other, the leftward and rightward directions are opposite to each other, and the forward and rearward directions are opposite to each other.

A case where the "movement direction is changed to the opposite direction" in step S1111 does not include a case where a state in which the movement direction is not recorded in storage 202 is changed to a state in which the movement direction is recorded. A case where the "movement direction is changed to the opposite direction" in step S1111 does not include a case where a state in which the movement direction is not recorded in storage 202 is changed to a state in which explicit recording of the "no" movement direction is performed.

In a case where the determination result of step S1111 is No, the process proceeds to step S1141. In step S1141, processor 201 transmits an instruction to at least one of speaker 205, vibrator 206, and display 207, and transmits the instruction of the movement direction and the movement amount (if the movement amount is recorded in storage 202) recorded in storage 202 to the user of movement-direction determination apparatus 100. In a case where the instruction is performed using speaker 205 or display 207, the movement direction and the movement amount are informed as language to the user. In a case where the instruction is performed using vibrator 206, the movement direction is informed to the user by using a vibration pattern or a portion in which vibration occurs in movement-direction determination apparatus 100. For example, in a case where movement-direction determination apparatus 100 is worn on the head of the user, movement to the leftward or rightward direction may be instructed by vibration for a head side area, or movement to the rearward direction may be instructed by vibration for a head front area or a head rear area. In a case where the instruction is performed using vibrator 206, the movement amount may be represented by vibration magnitude.

In a case where the determination result of step S1111 is Yes, the process proceeds to step S1112. In step S1112, processor 201 transmits an instruction to at least one of speaker 205, vibrator 206, and display 207, and warns the user of movement-direction determination apparatus 100 about excessive movement of camera 203. For example, in a case where the movement instruction to the "leftward direction" is currently recorded in storage 202 even though the previous instruction is the movement instruction to the "rightward direction", there is a high possibility that a imaging range of camera 203 will exceed recognition target 120 rightwards since the movement to the rightward direction is excessively performed. The process of step S1111 is performed, and thus, the movement direction may be more appropriately instructed to the user. If the process of step S1112 is ended, the process proceeds to step S1106, and the movement-direction instruction process is ended.

If the process of step S1141 is ended, the process proceeds to step S1142. In step S1142, processor 201 resets a counter used for measuring a same-movement-direction-instruction non-existing duration. The same-movement-direction-instruction non-existing duration is an elapsed time from the previous instruction when the same direction as the previously instructed movement direction is instructed.

In a case where the determination result of step S1101 is No, the process proceeds to step S1102. In step S1102, processor 201 determines whether or not the movement direction recorded in storage 202 is the leftward or rightward direction and the movement amount thereof is increased.

In a case where the determination result of step S1102 is Yes, the process proceeds to S1121. In step S1121, processor 201 inverses the result of the matching determination acquired in step S921. That is, the matching determination indicating whether or not sightline direction 1020 of user 110 and the orientation of imaging direction 1030 of the camera of movement-direction determination apparatus 100 match each other is changed to "non-matching" if the sightline direction and the orientation match each other, and is changed to "matching" if the sightline direction and the orientation do not match each other. For example, as a case where the movement amount is increased, a case where the user who receives the movement instruction to the "rightward direction" moves camera 203 to the "leftward direction" is assumed. In a case where the user moves camera 203 in this manner, there is a high possibility that the leftward or rightward direction of movement-direction determination apparatus 100 and the leftward or rightward direction of the user will be opposite to each other. Accordingly, the process of step S1121 is performed, and the matching determination is inverted. Thus, it is possible to more appropriately transmit the instruction of the movement direction to the user.

If the process of step S1121 is ended, the process proceeds to step S1122. In step S1122, processor 201 transmits an instruction to at least one of speaker 205, vibrator 206, and display 207, and warns the user of movement-direction determination apparatus 100 about the movement of camera 203 to the opposite orientation. In a case where the instruction is performed using speaker 205 or display 207, processor 201 outputs the content of the instruction as language, and warns the user. In a case the instruction is performed using vibrator 206, processor 201 warns the user by using a predetermined vibration pattern.

In a case where the determination result of step S1102 is No, the process proceeds to step S1103. In step S1103, processor 201 determines whether or not the movement direction recorded in storage 202 is the upward or downward direction or the backward direction (forward or rearward direction) and the movement amount thereof is increased.

In a case where the determination result of step S1103 is Yes, the process proceeds to step S1122. In step S1122, processor 201 transmits an instruction to at least one of speaker 205, vibrator 206, and display 207, and warns the user of movement-direction determination apparatus 100 about the movement of movement-direction determination apparatus 100 (or camera 203) to the opposite orientation. In a case where the instruction is performed using speaker 205 or display 207, processor 201 outputs the content of the instruction as language, and warns the user. In a case the instruction is performed using vibrator 206, processor 201 warns the user by using a predetermined vibration pattern.

In a case where the determination result of step S1103 is No, the process proceeds to step S1104. In step S1104, processor 201 determines whether or not a value of the counter that measures the same-movement-direction-instruction non-existing duration is greater than a predetermined value (T seconds) by referring to the value of the counter.

In a case where the determination result of step S1104 is Yes, the process proceeds to step S1141. Meanwhile, in a case where the determination result of step S1104 is No, the process proceeds to step S1105, and the counter is counted up. By doing this, the process of processor 201 proceeds to the movement-direction instruction process, and the repetitive instruction to move the camera toward the same direction for a short period of time is controlled.

If the process of step S1142 or step S1105 is ended, the process proceeds to step S1106, and the movement-direction instruction process is ended.

If the movement-direction instruction process is ended, the process returns to step S301, and the processes from step S301 to step S306 are repeated until it is not necessary to perform the movement-direction instruction process (No in step S305).

In a case where the determination result of step S305 is No, the process proceeds to step S307. In step S307, processor 201 regards camera 203 to appropriately catch recognition target 120, and determines whether or not there is a blur on image 400. The determination of whether or not there is the blur on image 400 may be performed by an existing method. For example, in a case where contrast of image 400 is lower than a predetermined value or a case where sharpness of the edge of image 400 is lower than a predetermined value, it is determined that there is the blur on image 400.

In a case where it is determined that there is the blur on image 400 (Yes in step S307), the process proceeds to step S308. In step S308, processor 201 transmits an instruction to at least one of speaker 205, vibrator 206, and display 207, and warns the user of movement-direction determination apparatus 100 such that movement-direction determination apparatus 100 (or camera 203) is stopped. In a case where the instruction is performed using speaker 205 or display 207, processor 201 outputs the content of the instruction as language, and warns the user. In a case the instruction is performed using vibrator 206, processor 201 warns the user by using a predetermined vibration pattern.

After the processor warns the user of movement-direction determination apparatus 100 such that movement-direction determination apparatus 100 (or camera 203) is stopped, the process proceeds to step S301. By doing this, the process of determining whether or not the movement instruction is necessary (step S305) is performed again. Accordingly, it is possible to prevent the user from stopping camera 203 in a location in which recognition target 120 is not appropriately caught.

In a case where it is determined that there is the blur on image 400 (No in step S307), the process proceeds to step S309.

In step S309, processor 201 performs a pattern recognition process. As the pattern recognition process, a recognition process appropriate for recognition target 120 may be appropriately performed. As an example of the pattern recognition process, existing pattern recognition such as character recognition, barcode reading, or signal recognition may be applied. Processor 201 records the result of the recognition process in storage 202.

In step S310, processor 201 reads the recognition process result of step S309 from storage 202, and outputs the read result to an output device such as display 207.

[1-3. Advantages]

As mentioned above, in the present exemplary embodiment, the processor of the movement-direction determination apparatus and the movement-direction determination method of the present disclosure determine the movement direction of the camera that images the polygonal recognition target. The processor acquires the orientation of the camera acquired by the sensor of the camera, acquires the image of the recognition target imaged by the camera, determines the number of corners of the recognition target included in the image, and determines the movement direction of the camera based on the orientation of the camera and the number of corners.

Accordingly, a situation in which the camera does not appropriately catch the recognition target can be estimated based on the corners of recognition target 120. A direction in which a recognition direction of user 110 can be estimated based on the orientation of the camera. The result estimated as stated above can be reflected on the direction of the movement instruction. As a result, even in a case where it is difficult for user 110 to visually perceive the location of recognition target 120 as shown in FIG. 1, the movement direction of the camera can be appropriately informed to user 110.

The processor of the movement-direction determination apparatus and the movement-direction determination method of the present disclosure determine that the movement direction of the camera is the rearward direction in a case where the number of corners of the recognition target included in the image is equal to or less than a first predetermined value.

Accordingly, a case where the camera is excessively close to the recognition target is detected from the number of corners, and thus, the movement to the rearward direction can be instructed. Therefore, the movement direction of the camera can be more appropriately informed to user 110.

The processor of the movement-direction determination apparatus and the movement-direction determination method of the present disclosure determine the coordinates of the corner which is not included in the image in a case where the number of corners of the recognition target included in the image is (the number of corners of the recognition target−1), and determine the movement direction of the camera based on the orientation of the camera and the coordinates of the corner which is not included in the image.

Accordingly, the instruction indicating that the camera moves toward the coordinates of the corner which is not included in the image can be performed. Therefore, the movement direction of the camera can be more appropriately informed to user 110.

The processor of the movement-direction determination apparatus and the movement-direction determination method of the present disclosure determine whether or not the sightline direction of the user of the camera matches the imaging direction of the camera, and determine that the movement direction is a direction acquired by laterally inverting the orientation of the movement direction in a case where the sightline direction of the user of the camera does not match the imaging direction of the camera, unlike a case where the sightline direction of the user of the camera matches the imaging direction of the camera.

Accordingly, the sense of direction and the movement direction of user 110 can be matched. Therefore, the movement direction of the camera can be more appropriately informed to user 110.

The processor of the movement-direction determination apparatus and the movement-direction determination method of the present disclosure determine the change of the movement direction by comparing the previously determined movement direction with the currently determined movement direction, and instruct the output device to warn the user about the excessive movement of the camera if the change of the movement direction is a change indicating movement to the opposite direction.

Accordingly, it is possible to warn the user in a case where user 110 excessively moves the camera based on the movement instruction. Therefore, the movement direction of the camera can be more appropriately informed to user 110.

The processor of the movement-direction determination apparatus and the movement-direction determination method of the present disclosure calculate the movement amount in the movement direction, and instruct the output device to output information indicating that the camera is to be moved based on the movement amount.

Accordingly, user 110 can move the camera while being conscious of a specific movement amount. Therefore, the movement direction of the camera can be more appropriately informed to user 110.

The processor of the movement-direction determination apparatus and the movement-direction determination method of the present disclosure calculate the movement amount in the movement direction. The changes of the movement direction and the movement amount are determined by comparing the previously determined movement direction and movement amount with the currently determined movement direction and movement amount, and instructs the output device to warn the user about the movement of the camera to the opposite orientation in a case where the movement direction is not changed and the movement amount is increased.

Accordingly, it is possible to warn the user in a case where user 110 misunderstands the movement instruction and moves the camera. Therefore, the movement direction of the camera can be more appropriately informed to user 110.

The processor of the movement-direction determination apparatus and the movement-direction determination method of the present disclosure determine whether or not the sightline direction of the user of the camera and the imaging direction of the camera match each other. Unlike the sightline direction of the user of the camera and the imaging direction of the camera match each other, in a case where the sightline direction of the user of the camera and the imaging direction of the camera do not match each other, it is determined that the movement direction is a direction acquired by laterally inverting the orientation of the movement direction, and inverts the determination result of whether or not the sightline direction of the user of the camera and the imaging direction of the camera match each other in a case where the movement direction is maintained as being the leftward direction or the rightward direction without being changed and the movement amount is increased.

Accordingly, even in a case where user 110 erroneously inputs the matching determination result to the movement-direction determination apparatus, it is possible to modify the error. Therefore, the movement direction of the camera can be more appropriately informed to user 110.

Another Exemplary Embodiment

As described above, Exemplary Embodiment 1 has been described as an example of the technology disclosed in the present application. However, the technology of the present disclosure is not limited thereto, and may be applied to exemplary embodiments acquired by appropriately being modified, replaced, added, or omitted. A new exemplary embodiment may be acquired by combining the constituent elements described in Exemplary Embodiment 1 described above.

Since the above-described exemplary embodiment is an example of the technology of the present disclosure, the above-described exemplary embodiment may be variously modified, replaced, added, or omitted without departing from the claims or the equivalent scopes thereto.

INDUSTRIAL APPLICABILITY

The present disclosure may be applied to, for example, inspection and shipment operations within a warehouse.

REFERENCE MARKS IN THE DRAWINGS

100 movement-direction determination apparatus
110 user
120 recognition target
130 freight
201 processor
202 storage
203 camera
204 sensor
205 speaker
206 vibrator
207 display
208 input device 210 bus
400 image
610 business card
611 corrugated board
620 edge
621 edge
630 parallel edge
640 polygon
650 polygon
651 corner
652 corner
653 corner
654 corner
810 corner
1010 corner coordinates
1020 sightline direction
1030 imaging direction

The invention claimed is:

1. A movement-direction determination method of causing a processor to determine a movement direction of a camera that images a polygonal recognition target, the method comprising:
   causing the processor to acquire an orientation of the camera acquired by a sensor included in the camera;
   causing the processor to acquire an image of the recognition target imaged by the camera;
   causing the processor to determine a number of corners of the recognition target included in the image;
   causing the processor to determine the movement direction of the camera based on the orientation of the camera and the number of corners; and
   causing the processor to determine coordinates of a corner which is not included in the image, and to determine the movement direction of the camera based on the orientation of the camera and the coordinates of the corner which is not included in the image, in a case where the number of corners of the recognition target included in the image is one less than an actual number of corners of the recognition target.

2. A movement-direction determination method of causing a processor to determine a movement direction of a camera that images a polygonal recognition target, the method comprising:
   causing the processor to acquire an orientation of the camera acquired by a sensor included in the camera;
   causing the processor to acquire an image of the recognition target imaged by the camera;
   causing the processor to determine a number of corners of the recognition target included in the image;
   causing the processor to determine the movement direction of the camera based on the orientation of the camera and the number of corners;
   causing the processor to determine whether or not a sightline direction of a user of the camera matches an imaging direction of the camera; and
   causing the processor to determine that the movement direction is a direction acquired by laterally inverting an orientation of the movement direction in a case where the sightline direction of the user of the camera does not match the imaging direction of the camera, unlike the sightline direction of the user of the camera matches the imaging direction of the camera.

3. A movement-direction determination method of causing a processor to determine a movement direction of a camera that images a polygonal recognition target, the method comprising:
   causing the processor to acquire an orientation of the camera acquired by a sensor included in the camera;
   causing the processor to acquire an image of the recognition target imaged by the camera;
   causing the processor to determine a number of corners of the recognition target included in the image;
   causing the processor to determine the movement direction of the camera based on the orientation of the camera and the number of corners;
   causing the processor to determine a change of the movement direction by comparing a previously determined movement direction with a currently determined movement direction; and
   causing the processor to instruct an output device to warn about excessive movement of the camera if the change of the movement direction is a change indicating movement to an opposite direction.

4. A movement-direction determination method of causing a processor to determine a movement direction of a camera that images a polygonal recognition target, the method comprising:
   causing the processor to acquire an orientation of the camera acquired by a sensor included in the camera;
   causing the processor to acquire an image of the recognition target imaged by the camera;
   causing the processor to determine a number of corners of the recognition target included in the image;
   causing the processor to determine the movement direction of the camera based on the orientation of the camera and the number of corners;
   causing the processor to calculate a movement amount in the movement direction;
   causing the processor to determine changes of the movement direction and the movement amount by comparing previously determined movement direction and movement amount with currently determined movement direction and movement amount; and
   causing the processor to instruct an output device to warn about a movement of the camera to an opposite orientation in a case where the movement direction is not changed and the movement amount is increased.

5. The movement-direction determination method of claim 4, further comprising:
   causing the processor to determine whether or not a sightline direction of a user of the camera matches an imaging direction of the camera;
   causing the processor to determine that the movement direction is a direction acquired by laterally inverting an orientation of the movement direction in a case where the sightline direction of the user of the camera does not match the imaging direction of the camera, unlike a case where the sightline direction of the user of the camera matches the imaging direction of the camera; and
   causing the processor to invert a determination result of whether or not the sightline direction of the user of the camera matches the imaging direction of the camera in a case where the movement direction is maintained as being a leftward direction or a rightward direction without being changed and the movement amount is increased.

6. A movement-direction determination apparatus that includes a processor, and causes the processor to determine a movement direction of a camera which images a polygonal recognition target, wherein the processor is configured to
acquire an orientation of the camera acquired by a sensor included in the camera;
acquire an image of the recognition target imaged by the camera;
determine the number of corners of the recognition target included in the image; and
determine the movement direction of the camera based on the orientation of the camera and the number of corners, and
wherein, in a case where the number of corners of the recognition target included in the image is one less than an actual number of corners of the recognition target, the processor is configured to determine coordinates of a corner which is not included in the image, and determines the movement direction of the camera based on the orientation of the camera and the coordinates of the corner which is not included in the image.

7. A movement-direction determination apparatus that includes a processor, and causes the processor to determine a movement direction of a camera which images a polygonal recognition target,
wherein the processor is configured to
acquire an orientation of the camera acquired by a sensor included in the camera;
acquire an image of the recognition target imaged by the camera;
determine a number of corners of the recognition target included in the image;
determine the movement direction of the camera based on the orientation of the camera and the number of corners;
determine whether or not a sightline direction of a user of the camera matches an imaging direction of the camera; and
determine that the movement direction is a direction acquired by laterally inverting an orientation of the movement direction in a case where the sightline direction of the user of the camera does not match the imaging direction of the camera, unlike a case where the sightline direction of the user of the camera matches the imaging direction of the camera.

8. A movement-direction determination apparatus that includes a processor, and causes the processor to determine a movement direction of a camera which images a polygonal recognition target,
wherein the processor is configured to
acquire an orientation of the camera acquired by a sensor included in the camera;
acquire an image of the recognition target imaged by the camera;
determine a number of corners of the recognition target included in the image;
determine the movement direction of the camera based on the orientation of the camera and the number of corners;
determine a change of the movement direction by comparing a previously determined movement direction with a currently determined movement direction; and
instruct an output device to warn about excessive movement of the camera if the change of the movement direction is a change indicating movement to an opposite direction.

9. A movement-direction determination apparatus that includes a processor, and causes the processor to determine a movement direction of a camera which images a polygonal recognition target,
wherein the processor is configured to
acquire an orientation of the camera acquired by a sensor included in the camera;
acquire an image of the recognition target imaged by the camera;
determine a number of corners of the recognition target included in the image;
determine the movement direction of the camera based on the orientation of the camera and the number of corners;
calculate a movement amount in the movement direction;
determine changes of the movement direction and the movement amount by comparing previously determined movement direction and movement amount with currently determined movement direction and movement amount; and
instruct an output device to warn about movement of the camera to an opposite orientation in a case where the movement direction is not changed and the movement amount is increased.

10. The movement-direction determination apparatus of claim 9,
wherein the processor is configured to
determine whether or not a sightline direction of a user of the camera matches an imaging direction of the camera;
determine that the movement direction is a direction acquired by laterally inverting an orientation of the movement direction in a case where the sightline direction of the user of the camera does not match the imaging direction of the camera, unlike a case where the sightline direction of the user of the camera matches the imaging direction of the camera; and
invert a determination result of whether or not the sightline direction of the user of the camera matches the imaging direction of the camera in a case where the movement direction is maintained as being a leftward direction or a rightward direction without being changed and the movement amount is increased.

* * * * *